United States Patent [19]
Yeh

[11] Patent Number: 5,528,758
[45] Date of Patent: Jun. 18, 1996

[54] METHOD AND APPARATUS FOR PROVIDING A PORTABLE COMPUTER WITH INTEGRATED CIRCUIT (IC) MEMORY CARD STORAGE IN CUSTOM AND STANDARD FORMATS

[76] Inventor: Keming W. Yeh, 43765 Abeloe Ter., Fremont, Calif. 94539

[21] Appl. No.: 975,375

[22] Filed: Nov. 13, 1992

Related U.S. Application Data

[63] Continuation-in-part of Ser. No. 786,483, Nov. 1, 1991, abandoned.

[51] Int. Cl.$^6$ .............................. G06F 3/00; G06F 13/00
[52] U.S. Cl. .................... 395/200.08; 395/882; 395/885; 395/890; 395/892; 395/800; 364/708.1; 364/DIG. 1; 364/229; 364/229.4; 364/231.1; 364/231.2; 364/249.2; 364/249.3; 235/380
[58] Field of Search .................. 361/392, 393, 361/394, 395; 364/708, 708.1; 395/200, 275, 325, 500, 800, 200.01, 200.03, 200.08, 821, 872, 882, 885, 890, 892, 893, 280

[56] References Cited

U.S. PATENT DOCUMENTS

| | | | |
|---|---|---|---|
| 4,377,852 | 3/1983 | Thomson | 395/500 |
| 4,654,818 | 3/1987 | Wetterau, Jr. | 395/500 |
| 4,769,764 | 9/1988 | Levanon | 364/708 |
| 4,819,151 | 4/1989 | May | 395/650 |
| 4,903,222 | 2/1990 | Carter et al. | 364/708 |
| 4,982,324 | 1/1991 | McConaughy et al. | 395/200.09 |
| 5,126,954 | 6/1992 | Morita | 364/708 |
| 5,227,953 | 7/1993 | Lindberg et al. | 361/393 |
| 5,265,238 | 11/1993 | Canova, Jr. et al. | 395/500 |
| 5,301,334 | 4/1994 | Horiuchi | 395/750 |
| 5,313,596 | 5/1994 | Swindler et al. | 395/281 |
| 5,323,291 | 6/1994 | Boyle et al. | 361/683 |
| 5,347,425 | 9/1994 | Herron | 361/683 |

OTHER PUBLICATIONS

Rosenberg, J. M. Dictionary of Computers, Information Processing & Telecommunications, 2d ed., N.Y. John Wiley & Sons, 1987, p. 472.

*Primary Examiner*—Thomas C. Lee
*Assistant Examiner*—Lance L. Barry
*Attorney, Agent, or Firm*—Skjerven, Morrill, MacPherson, Franklin & Friel; Edward C. Kwok

[57] ABSTRACT

A portable information storage and transfer device for use with IC memory card-based portable computers obviates many operations traditionally requiring a desktop computer. The floppy disk drive in the information storage and transfer device allows large amount of data and software programs to be made available to the IC memory card-based computer on floppy disks. The contents of such floppy disk can then be transferred for use in the portable computer on a blank IC memory card or the portable computer's system memory. Information entered into and stored in the system memory or an IC memory card of the portable computer can also be transferred through the information storage and transfer device to floppy disks, to a printer, to various peripheral devices or to a host computer. A built-in modem for accessing facsimile machines, other modems and the telephone system is also provided. Many types of software programs required to enable these functions of information storage, transfer, printout and communication can all be stored locally rather than on relatively expensive IC memory cards, and read into the information storage and transfer device on demand.

2 Claims, 3 Drawing Sheets

METHOD AND APPARATUS FOR PROVIDING A PORTABLE COMPUTER WITH INTEGRATED CIRCUIT (IC) MEMORY CARD STORAGE IN CUSTOM AND STANDARD FORMATS

CROSS-REFERENCE TO RELATED APPLICATIONS

This patent application is a continuation-in-part application of application entitled "Portable Information Storage and Transfer Device for Portable Computers" by Dr. Keming W. Yeh, Ser. No. 07/786,483 filed Nov. 1, 1991, now abandoned.

FIELD OF INVENTION

This invention relates to the field of portable and hand-held computers and particularly to an information storage and transfer device for use with integrated circuit memory card-based hand-held and portable computers.

BACKGROUND OF THE INVENTION

Many portable computers, especially hand-held or "palm-top" computers, use integrated circuit memory cards ("IC memory cards") as the primary media of information storage. Such IC memory card include memory storage elements such as static random access memory (SRAM) or such electrical programmable and erasable non-volatile memory elements as "flash" memory. These IC memory cards are typically each the size of a customary credit card. IC memory cards are used in portable computers in place of hard disk drives and floppy disk drives (HDDs, FDDs) in order to achieve the significant advantages of the size, weight, and battery lifetime attributes of the portable computer and to increase portability of the storage media. However, because of the limited memory density attainable in each IC memory card, and the high cost of IC memory chips, using IC memory cards in hand-held computers imposes limitations not encountered in less portable computers, which typically use more power-consuming and heavier hard and floppy disk drives as their primary storage media. Also, in order to avoid the sizes and weights of the necessary power supply unit and the interface adaptor, hand-held computers are typically not equipped with the standardized interfaces (e.g. RS232C) found on larger desktop and laptop computers. This is because standardized interfaces are larger than can be conveniently provided on such hand-held computers and require voltages and power output levels impractical for such hand-held computers, if the requirements of size, weight and long battery lifetime are to be met.

Using IC memory cards as the primary media of storage in these portable computers also creates a problem in software distribution. Since these portable computers find wide applications in the consumer, industrial and vertical markets, an economical way for distributing application software is key to the wide acceptability of these portable computers. Currently, because of the high cost and density limitations, it is neither easy nor economical to sell, distribute or upgrade application software using IC memory cards. An alternative to reduce card cost, rather than using read/write IC memory card, software and data may be distributed using Read-Only Memory (ROM) cards. However, ROM cards require long lead times to produce and require substantial volume to be economical. Since there is seldom guarantee that a given software will sell "well" in volume, a software manufacturer assumes significant inventory risk when adopting a ROM card distribution strategy.

Because portable computers are often issued by corporations to field personnel to provide "at their fingertips" easy access to a large amount of essential information, e.g. product and customer information, there is a need to efficiently distribute and update such information. Currently, such update or distribution to a portable computer user is performed by issuing a new IC memory card with the information already loaded, or by downloading the data or software using a modem. A special modem attachment to a hand-held computer capable of communicating with a facsimile machine, or accessing E-mail or local area networks requires the use of customized software provided on an IC memory card. Such modem attachment is expensive relative to the cost of the hand-held computer, so that many applications of the hand-held computer requiring the use of a modem are rendered uneconomical. As can be readily appreciated from the above, the use of IC memory cards for distribution and update purposes is limited both by the cost and the relatively modest capacity of the IC memory card. Since data transfer using a modem or an IC memory card limits the amount of data that can be transferred at a time, the problem of data distribution is by no means solved by the use of modems or the use of IC memory cards. Further, because prospective users of these portable computers are found in a variety of services, e.g. insurance or property sales, service calls, courier service, field engineering, surveyors, medical calls, accident or property assessors, etc., the use of IC memory cards as the primary storage media in these portable computers is indeed severely limiting the wide spread acceptability in these industries.

Another disadvantage often found in hand-held computers using the IC memory card as the primary storage medium results from the portable computer's inability to provide a variety of system services related to the use of a computer, e.g. connecting to a hard copy device, or transferring important data to a backup facility to prevent loss of data. This is because, as explained above, standardized interfaces to peripheral equipment are typically larger and require generating voltage levels impractical in a hand-held computer, due to their size, weight and power conservation requirements. Thus, each interface to a peripheral device is through a separate adapter which provides both the standard size connector and the necessary voltage level and signal representation conversions. At present, a number of these adapters are required to provide the various interfaces to common peripheral devices. Such adapters are bulky and cannot be simultaneously connected to the single small I/O connector on the hand-held computer. In addition, each adaptor is connected to the hand-held computers via a customized cable and powered by the power supply of the hand-held computer. Even performing the most common applications, such as data backup and printing, require multiple adapters and each adaptor drains the precious battery power from the hand-held computer. To perform data backup, for example, a popular "PC-link cable" is used to connect a hand-held computer to the RS232C (serial) port of a desk top computer over a customized cable and a bulky attachment. The PC link cable provides only data transfer capability and requires both using the customized software and operating the desk top computer. To perform printing, a "printer-link cable" connects the hand-held computer to a printer for printing. Again, the connection to the printer requires another customized cable, a bulky adaptor and uses customized software. Of significance also, because the PC-link and printer-link cables plug into the same port on the hand-held computer, printing and data backup cannot at present be performed simultaneously. Further, since the printer-link and PC-link cables are expensive relative to the cost of the handheld computer, customized cables and adapters are very uneconomical ways to provide common applications in the hand-held computer.

Therefore, because of the limited functionalities necessitated by the size, weight and long battery lifetime requirements of such portable computers, users of these IC memory card-based portable computers are often required to perform through a desk-top computer, such tasks as data backup or printing after the necessary data is transferred to the desktop computer. The importance of such functions as information backup or obtaining hard copies is self-evident, once one appreciates that the data most often stored in such computers are, for example, telephone numbers, addresses, memoranda, past appointment schedules, spreadsheets or databases etc. Information backups are particularly essential for record keeping and for recovering from an occasional system malfunction.

In addition, because the memory capacity of an IC memory card-based portable computer is limited, it is often necessary to unload the software and data of one application program to create space for use by another application program. Currently, transfer from the portable computer to the desk top computer is cumbersome. For example, the user may be required to buy both a customized connection cable and a special communication software, and be required to perform a sophisticated set of tasks, such as connecting the cable to a RS232C port on the backplane of a desktop computer, setting up files and operating the communication software from the desktop computer. For many people, the apparent level of required skill to perform these tasks form a psychological barrier to their ability to use the portable computer effectively. Further, the cost of a desktop computer is often not justified for people who do not otherwise need a desk-top computer.

In the prior art, a number of computer system of various size, weight, shape, and power supply capabilities can be found. The computer systems described in U.S. Pat. No. 4,330,839 to Miller et. al., entitled "Programmable Calculator including Means for Automatically Processing Information Stored on a Magnetic Record Member", filed on Jun. 29, 1979, issued on May 18, 1982, and in U.S. Pat. No. 4,117,542 to Klausner et. al., entitled "Electronic Pocket Directory", filed on Jul. 7, 1977 and issued on Sep. 26, 1978 are examples of such computers. While each of these patents discloses a computer system comprising a keyboard, a display, electronic circuit boards and a system memory (in the case of Miller et. al., a removable storage medium also), they address neither the problem of limited capacity of an IC memory card nor the attendant high cost of such removable storage medium. Neither do these patents disclose or propose a separate integrated peripheral device to address these deficiencies commonly found in a IC memory card-based portable computer.

U.S. Pat. No. 4,591,974 to Dornbush et. al., entitled "Information Recording and Retrieval System", filed on Jan. 31, 1984 and issued on May 27, 1986, discloses a combination of a hand-held computer and a host computer for generating reports. In this system, the host computer uses data taken in the field by the hand-held unit, which has a keyboard, a display, some memory and a microprocessor. In the system disclosed by Dornbush, essential operations, such as providing forms for data input, providing instructions, and providing codes of authorized users etc., are directed by the host computer, which acts both as an information processing unit and a backup unit to the hand-held computer. Dornbush et al., however, fail to address the problem of transferring large amount of data and software of any type to an IC memory card-based hand-held computers to be stored, reviewed and executed, especially where the hand-held unit has limited capacity in its fixed and removable storage media. Furthermore, Dornbush et al. do not provide a solution to the problems in a portable computer of providing information backup, communicating with other processors, transferring data between removable storage media and obtaining a hard copy of the data without using a host computer.

In the prior art, there are numerous intelligent peripheral devices for such functions as information storage, printout, communication, and input/output (I/O). However, none of these devices integrate these functions into a single device in the manner achieved by the present invention to be described hereinafter.

SUMMARY OF THE INVENTION

In accordance with the present invention, a structure and a method are provided to achieve an information storage and transfer device for use with a portable or hand held computer. Such information storage and transfer device includes a microprocessor-based control circuit, means for recording data on and reading data from a removable medium, multiple input/output ports and a power supply unit. The data recording and reading means, the data ports and the control circuit are interconnected by a common bus controlled by the microprocessor.

The data recording and reading means can, for example, be a floppy disk drive accepting diskettes of one or more data densities and formats. The microprocessor-based control circuit includes (a) a microprocessor of 8-, 16-, or 32-bit or any suitable word size; (b) memory means having read-only memory (ROM) components for "booting-up" the information storage and transfer device upon power up; (c) flash memory components for storing in a non-volatile but reprogrammable manner software and data necessary for the microprocessor to control certain data processing or peripheral interfacing tasks, some of these tasks being customized to the portable computer to which the information storage and transfer device is connected; (d) dynamic random access memory (DRAM) components for storing temporarily instructions and data during software execution; (e) I/O controller logic circuits for controlling various I/O functions at the data ports; and (f) a modem for communication with other modems and facsimile machines.

The data ports include one or more standardized interfaces to a host computer or other peripheral devices. For example, a parallel port for connecting to a printer, a RS232C serial port for connecting to the telephone system or other communication network, a desktop computer, or a magnetic-card reader, and other ports customized for connecting to palm top computers, scanners, voice and other I/O devices.

The power supply unit allows the device to connect to either an AC source, disposable or rechargeable batteries, or a car battery. A fan for cooling can also be included, if necessary.

The housing of the information storage and transfer device is contoured to include on a top surface a recessed area for receiving securely a palm top computer during device operation. Further, a connector located in the housing allows the power supply unit to be connected to the palm top computer so as to provide power to the palm top computer during file transfer into and out of the palm top computer's storage devices, or when the palm top computer's modem port is used. The battery in the palm top computer can also be recharged by the power supply unit through the connector.

In one embodiment of the present invention, a standard card slot for reading such industry standard IC memory card and a customized card slot for reading the palm top computer's customized IC memory card are provided. The standard IC memory card slot can be used to receive data from and to transfer data to data source such as industry standard IC memory card customarily found in IBM PC compatible notebook computers. The received data can be transferred to any medium connected to information storage and transfer device, including the customized IC memory card slot. The customized IC memory card slot can be used to write IC memory card in the proprietary format of the palm top computer's IC memory card. The IC memory card in the palm top computer's proprietary format can then be used in the palm top computer's customized IC memory card slot. Because of the data transfer capability between the standard IC memory card slot and the customized IC memory card slot, third party software heretofore distributed only in standard IC memory card format can now be made available for use in the palm top computer through a simple copy from the standard IC memory card slot to the customized IC memory card slot. Likewise, third party software heretofore distributed only in the standard floppy disk can be made available to the palm top computer via a simple copy of data from the floppy disk to the customized IC memory of data card slot.

An advantage of the present invention provides both a method and a convenient and cost-effective means for transferring large amount of information of any type to an IC memory card-based portable computer.

Another advantage of the present invention provides both a method and an efficient device for allowing, without using a separate desk-top computer, the IC memory card-based portable computer to perform such functions as information backup, duplication, communication, printing and data input from other devices.

Another advantage of the present invention provides both a method and an apparatus, including built-in software, to access regular communication networks, such as the public telephone switch system. A built-in modem in one embodiment of the present invention provides access to facsimile machines, and allows data transmitted or received over the built-in modem to be backed up on floppy disks.

Another advantage of the present invention provides both a method and a convenient device for increasing the cost-effectiveness of an IC memory card-based portable computer by allowing the use of ordinary floppy disks, modems, printers without relying on the blank IC memory cards, customized peripheral devices, or a multiplicity of bulky adapters.

Another advantage of the present invention provides a stand-alone information storage and transfer device having its own power supply, a microprocessor-based control circuit, multiple I/O ports, and one or more floppy disk drives.

Another advantage of the present invention provides a simple and low-cost means for transferring information between palm top computer and desktop computer using ordinary floppy disks, without having to permanently tie up a RSb 232C port of the desktop computer by a pc-link cable as in the prior art. The present invention will be better understood upon consideration of the following detailed description and the accompanying drawings.

DETAILED DESCRIPTION OF THE PREFERRED EMBODIMENTS

Figure 1:
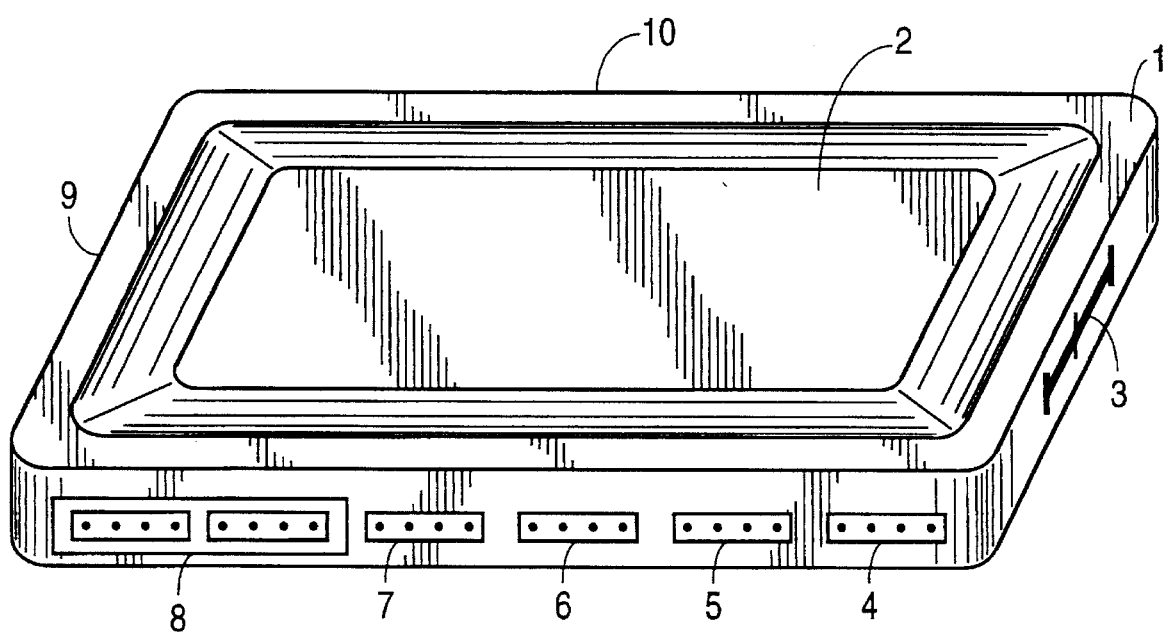
FIG. 1 is an outside view of the information storage and transfer device according to the present invention.

FIG. 1 shows a housing 1 of an information storage and transfer device 100 in accordance with the present invention. This information storage and transfer device 100 has formed a recessed base area 2 at a top-central portion of the housing 1. The recessed base area 2 is contoured for securely accommodating a palm top computer (not shown). As shown in FIG. 1, on one side of the housing 1 is an opening 3 for receiving into the floppy disk drive installed in the housing 1 a floppy disk or diskette. Also shown on a major sidewall of the housing 1 are input/output ports 4–8 for connection to host computers or peripheral devices using standardized communication protocols and connection cables. For example, parallel port 4 can be used to connect a printer; serial port 5, which may be a RS232C port, can be used to connect a communication network device, such as the telephone system; RS232C port 6 can be used to connect a host computer; port 7 can be used to connect a magnetic card reader; and I/O port 8 can be used to connect other I/O devices such as a hand-held or a desktop scanner, a wireless communication device such as a fax phone or a pager, a solid-state recorder, a voice input and output device, a mouse, a keyboard, a monitor, or a hard disk drive. The number and types of devices that can be connected to information storage and transfer device 100 are virtually limitless.

A third side of the housing 1 provides a port 9 (not shown) to connect a palm top computer. In the prior art, for the reason described previously regarding connector size and voltage levels in standardized interfaces, a palm top computer typically provides a customized cable for data transfer between the palm top and the desktop computers. This customized cable typically has a bulky attachment for connecting a customized port of the palm top to a standardized port of a desktop computer. Signal conversion and amplification are achieved by the electronics in the bulky attachment of the customized cables in the prior art. Prior to data transfer, the user must run customized software on both the palm top and the desktop computers to properly set up both machines. In accordance with the present invention, a simple cable connects port 9 to the customized port of the palm top computer. Because the communication protocols used in the customized port on a palm top computer vary from one manufacturer to another, the information storage and transfer device is provided software capable of communicating with the specific palm top it connects over port 9. As will be discussed in further detail, such software is provided in the non-volatile memory, e.g. an electrically erasable programmable read-only memory (EEPROM) or a flash memory. Along with the customized cable, the EEPROM is purchased with the information storage and transfer device.

A fourth side of the housing 1 provides for a power cord 10 which connects the internal power supply or battery compartment to an outside power source, such as a wall AC socket, or a car battery adapter.

Figure 2:
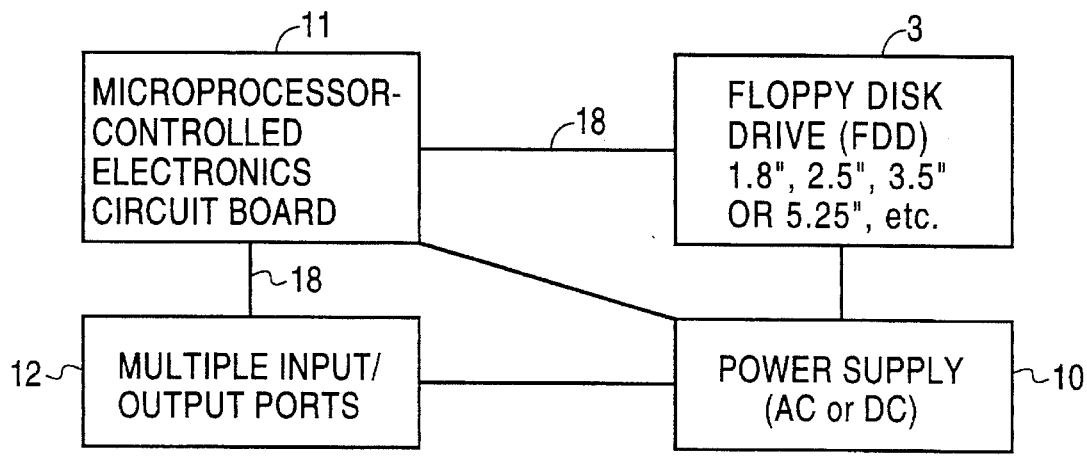
FIG. 2 is a block diagram of an embodiment of the present invention including the major modules.

FIG. 2 illustrates the major functional blocks in the embodiment of the present invention shown in FIG. 1. Recording module 3 comprises one or more floppy disk drives and the attendant controller or controllers. A floppy disk drive in recording module 3 can be any standardized format floppy disk drive, e.g. 1.8", 2.5", 3.5", 5.25", using the customary density diskettes of such floppy disk drives. Recording module 3 is controlled by a control circuit 11 over a bus 18, which can have a 8-, 16- or 32-bit word length. Control circuit 11 is a microprocessor-based control circuit, which is connected to the multiple input/output ports 12 by the bus 18. Multiple I/O ports 12 comprise various types of I/O ports for interfacing information storage and transfer device 100 with a host computer or other peripheral devices. Such peripheral devices include but are not limited to magnetic card readers, scanners and printers. Finally, power supply 10 includes automatically switchable AC or DC electrical connection for using a wall AC socket, disposable or re-chargeable batteries, or a car battery to power recording module 3, control circuit 11 and the input/output ports 12.

Figure 3:
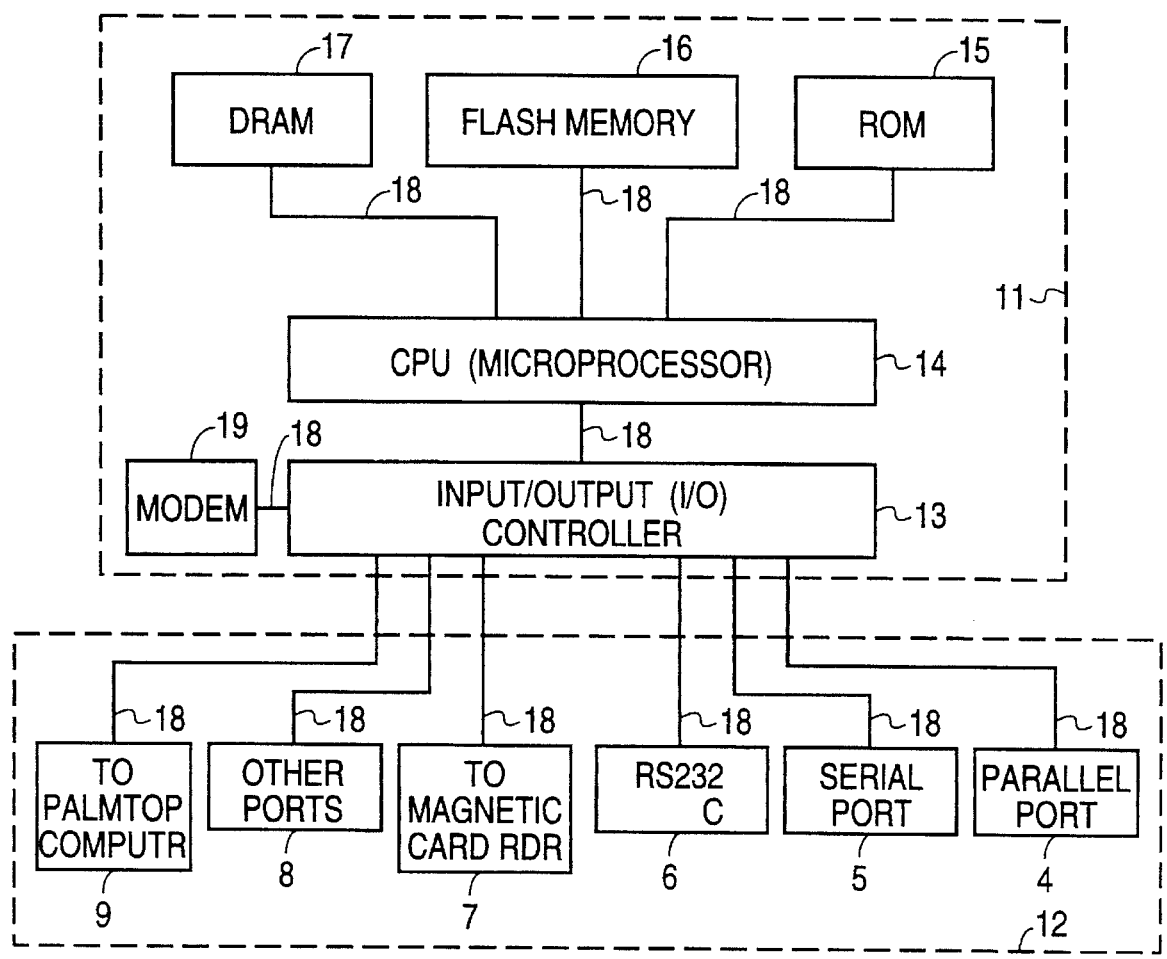
FIG. 3 is a block diagram of a control circuit for the information storage and transfer device in accordance with the present invention.

FIG. 3 shows the major functional blocks of the control circuit 11 of the present invention. CPU 14 can be a microprocessor of any word length, e.g. an 8-, 16-, or 32-bit microprocessor, which is connected by bus 18 of an appropriate bus width to ROM 15, flash memory 16 and dynamic random access memory (DRAM) 17 units. ROM unit 15 provides the permanently stored software programs and data, such as the software required to "boot up" the information storage and transfer device 100 upon power up. Flash memory unit 16 provides programmable storage for infrequently changed software programs and data, such as the programs necessary to interface with a customized port of a specific portable computer. DRAM unit 17 provides temporary storage area for software instructions and data being executed by the CPU 14. I/O controller unit 13 controls modem 19 and the various I/O ports 4–9 and is, in turn, controlled by CPU 14 over bus 18.

Modem 19 is a built-in modem provided with attendant software to allow (i) access to the telephone system, (ii) access to facsimile machines for sending and receiving facsimile transmission, (iii) access to other communication networks, such as E-mail, and (iv) other modems. The built-in software allows the user to transfer data between the floppy disk drive 3 and the network or host machine accessed by the modem 19. Because built-in modem 19 is powered by the power supply of the information storage and transfer device 100 and shares the connection to the palm top computer with the other functional units of information storage and transfer device 100, the built-in modem 19 can be provided at a much lower cost than the special modem attachment used currently by such palm top computers.

After power up, information storage and transfer device 100 executes an initialization sequence to set up the communication protocols necessary for data transfer over the multiple I/O ports 4–9. The initialization sequence includes loading from flash memory 16 into random access memory 17 device driver software necessary to control multiple I/O ports 4–9. CPU 14 constantly polls each of the various I/O ports 4–9 for a connection to an external device. For example, if connection to a palm top computer is detected, the CPU 14 receives in accordance with a predefined protocol instructions from the palm top computer. Such instructions include, for example, file transfer commands to and from the floppy disk drive of module 3. In most palm top computers, the user interface provides commands which the user can use to effectuate data transfer to and from another device, such as a desktop computer, over the single I/O port. Indeed, to use the aforementioned PC-link or printer-link cable in the prior art, after an application program is run on the desktop computer to set up the desktop computer, data transfer is effectuated by issuing a command on the palm top computer.

In the present embodiment, where existing protocol supports a remote device to take control of the palm top computer's input and display devices, the software in information storage and transfer device 100 can be invoked to take control of the input and display devices to provide input and output capability to CPU 14. Thus, no additional steps need to be performed in the palm top computer since the palm top computer already has built-in facility to support data transfer into and out of the palm top computer. Information storage and transfer device 100 uses the predefined protocols of the palm top computer, so that a connection to information storage and transfer device 100 is not different from a connection to a desktop computer over a pc-link cable.

Upon verifying on the palm top computer that a connection with the information storage and transfer device 100 is established, the user can then proceed to issue commands using the palm top computer's input facility, e.g. the keyboard to the information and transfer device 100. Such commands include fetching a file from a floppy disk, writing a file onto a floppy disk, connecting the palm top computer to an external computer through modem 19 or the network connection at port 5, and through desk-top computer port 6 to print a file on the printer connected to parallel port 4, or to control the magnetic card reader connected to I/O port 7. Many other instructions are of course possible. Since it is within one of ordinary skill in the art, upon consideration of the above description and drawings, to provide the software to be run on information storage and transfer device 100 to carry out the above-discussed functions, the detailed description of such program is omitted.

It will be appreciated from the above that the present invention allows transferring large amount of information, e.g. a software or data distribution, to a palm top computer using either one or more traditional floppy disks or over the built-in modem. Instead of using a separate IC memory card to store each of the programs the user routinely uses, the user needs only one read/write IC memory card on which the user selectively loads the desired program from a floppy disk through the portable information storage and transfer device 100. Since the cost of a floppy disk is much less than the cost of an IC memory card, many application programs which would otherwise not be made available to the palm top user because of the aforementioned cost and limited capacity reasons, can be made available through the information storage and transfer device by means of an inexpensive floppy disk. The same mechanism can also be used by corporations to distribute information to their field personnel. Thus, the advantage of the present invention in providing a convenient and cost-effective means for transferring large amount of information of any type to an IC memory card-based portable computer is achieved.

Transferring large amount of information can also be achieved over built-in modem 19. Because the information transferred can be obtained from or received into the relatively large storage space of floppy disks, the amount of data transfer attainable using the information storage and transfer device 100 is of a magnitude not currently achievable by a palm top computer using only IC memory cards and its internal main memory. Further, built-in modem 19 allows access to facsimile machines and communication media for such applications as E-mail and access to host computers at much reduced costs.

Further, since the palm top user can use information storage and transfer device 100 of the present invention to interface over the standardized input/output ports, such as ports 4–8, with other computers and peripheral devices, the present invention allows, without the use of a separate desk top computer or customized peripherals the IC memory card-based portable computer to perform such functions as information backup, duplication, communication, printing and data input from other devices. The present invention also eliminates a multiplicity of customized cable and bulky adapters. Further, a number of common applications such as data backup and printing can be performed simultaneously over the I/O ports 4–8. Thus, the palm top computer, together with the portable information storage and transfer device 100, provides capability equivalent to what is typically expected of a desk-top computer, without sacrificing the important portability attributes of the palm top machine.

To illustrate the power of information and storage device 100, an example is provided below taken from an application in the field of medicine. A medical doctor can have all her patients' medical and insurance records transferred from a desktop computer and stored on a few floppy disks which she keeps in her car. Before making her rounds at a hospital, she needs only transfer the necessary information extracted from the floppy disk on to the IC memory card of her palm top computer using the portable information storage and transfer device 100, which she also keeps in the car. Alternatively, the medical and insurance records can be obtained by connecting the palm top computer to an information storage and transfer device located at a nurses' station where such medical and insurance records are scanned through a magnetic card reader into either the memory or a floppy disk of the information storage and transfer device without using a desktop computer. During her visit at the hospital, she enjoys the portability of her palm top computer for such functions as taking notes about her patients, checking suitability of treatment using an IC memory card published by a physician's reference book source, and noting the treatment prescribed. Data input for these functions are adequately provided by the keyboard of the palm top computer. At the end of the day, she can down load the information compiled during her rounds onto a floppy disk, again using information storage and transfer device 100. The information about the visits and the prescribed treatments can be directly sent by the built-in modem to the computers of the insurance companies for billing purposes. The floppy disks are then given to her clerk for updating medical records, for accounting and other purposes maintained in the desktop or mainframe computer of her office.

Since the I/O ports, such as ports 4–8 of the information storage and transfer device 100, are standardized ports like those typically found on desk top computers, the present invention increases the cost-effectiveness of the IC memory card-based portable computers by providing access to ordinary floppy disks, modems, and printers without relying on the blank IC cards, and customized models of these peripheral devices, as is customary in the prior art.

Figure 4:
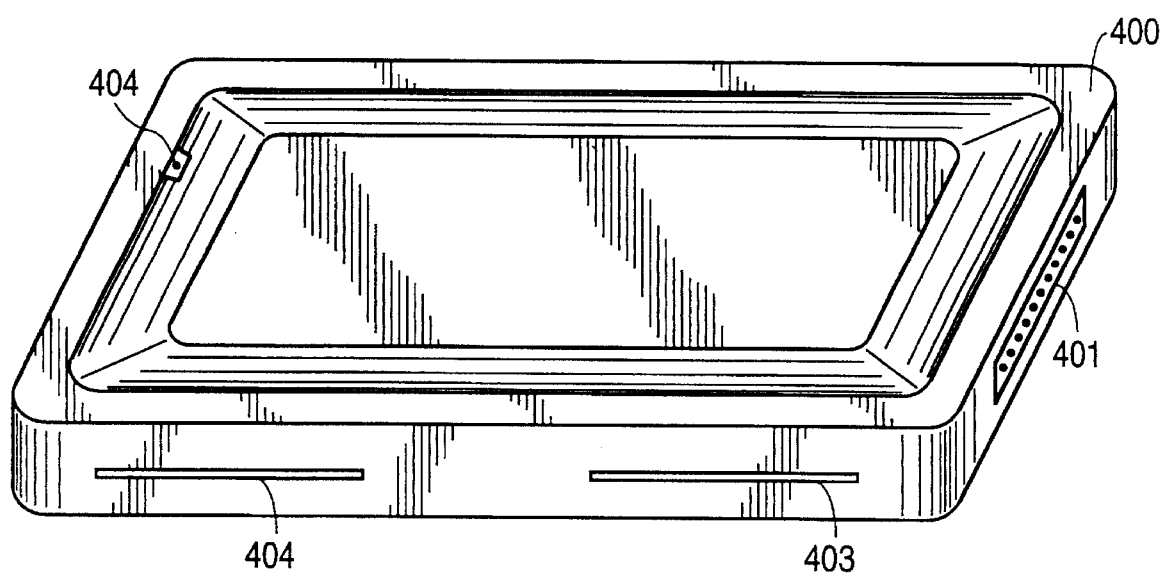
FIG. 4 is an outside view of another embodiment of the present invention, showing an information storage and transfer device 400 having standard IC memory card slot 402 and customized IC memory card slot 403.

Another embodiment of the present invention is shown in FIG. 4. As shown in FIG. 4, an information storage and transfer device 400 has a construction substantially the same as information storage and transfer device 100 shown in FIG. 1. Input and output ports, such as those similar to ports 4–8 are also provided on information storage and transfer device 400 one of the side walls not shown in FIG. 4. However, unlike information storage and transfer device 100, which has a built-in floppy disk device, information transfer and storage device 400 provides an industry standard connector 401 to an external floppy disk drive. Further, a connector 404 is provided for connecting a power input of the palm top computer. Since operations such as data transfer over the palm top computer's I/O port, or data transfer over the palm top computer's customized modem port can be very power consuming, connector 404 is intended to provide the palm top computer a supply of power for operation over a period time exceeding that provided by the rechargeable battery customarily carried by the palm top computer. In fact, when information storage and transfer device 400 is connected to an external AC power outlet, the palm top computer is provided power for such power-consuming operation indefinitely. Alternatively, connector 401 can be used to recharge the rechargeable battery of the palm top computer.

As shown also in FIG. 4, information storage and transfer device 400 provides a standard card slot 402 for reading an industry standard IC memory card and a customized card slot 403 for reading an IC memory card of the palm top computer's customized format. The standard IC memory card slot can be used to receive data from and to transfer data to data source such as industry standard IC memory card customarily found in IBM PC compatible notebook computers. The received data can then be transferred to any medium connected to information storage and transfer device 400, including another IC memory card in customized IC memory card slot 403. IC memory cards written by customized IC memory card slot 403 can be used as a source of data input to the palm top computer. Because of the data transfer capability between standard IC memory card slot 402 and customized IC memory card slot 403, third party software heretofore distributed only in standard IC memory card format can now be made available for use in the palm top computer by means of a simple copy from the standard IC memory card slot to the customized IC memory card slot. Likewise, third party software heretofore distributed only in standard floppy disk can be made available to the palm top computer via simple copy of data from the floppy disk to the customized IC memory of data card slot 403.

The above detailed description illustrates the specific embodiments of the present invention and is not intended to be limiting. Numerous variations and modifications can be made without departing from the scope of the present invention. For example, it is within the scope of the present invention to use as CPU 14 any available CISC (Complex Instruction Set Computer) or RISC (Reduced Instruction Set Computer) microprocessors. The choice between RISC and CISC processor in the present invention is, determined only by cost, performance and software-tool considerations. As another example, it is also within the scope of the present invention to use, in addition to or in lieu of the floppy disk drive in the recording module 3, an IC memory card reader, or a hard disk drive, as primary or additional storage media. In yet another example, it is also within the scope of the present invention to provide additional built-in capability in the information storage and transfer device, such as a communication adaptor or an interface to allow the information storage and transfer device to be part of a local area network, or to provide access to a satellite link. The present invention is defined by the following claims.

What is claimed is:

1. An information storage and transfer device, comprising:

a housing;

a first IC memory card device installed inside said housing for reading data from and storing data onto an IC memory card;

a connector mounted on said housing for interfacing with a data port of a portable computer;

a plurality of connecting means mounted on said housing for interfacing with peripheral devices and host computers; and means, provided inside said housing, for controlling said information storage and transfer device to effectuate data transfer between said portable computer and alternatively (i) said IC memory card, and (ii) one of said peripheral devices and host computers;

wherein said IC memory card device is adapted for reading and writing an IC memory card in accordance with a customized format, said device further comprising a second IC memory card device, installed inside said housing and coupled to said means for controlling, which reads and write IC memory cards in accordance with a standard format, said first and second IC memory card devices being provided for data transfers between IC memory cards storing information in said customized format and IC memory cards storing information in said standard format.

2. A method for providing an information storage and transfer device, comprising the steps of:

providing a housing;

installing an IC memory card device inside said housing for reading data from and storing data onto an IC memory card;

providing a connector mounted on said housing for interfacing with a data port of a portable computer;

providing a plurality of connecting means mounted on said housing for interfacing with peripheral devices and host computers; and providing means, installed inside said housing, for controlling said information storage and transfer device to effectuate data transfer between said portable computer and alternatively (i) said IC memory card, and (ii) one of said peripheral devices and host computers;

wherein said IC memory card device is adapted for reading and writing an IC memory card in accordance with a customized format, said device further comprising a second IC memory card device, installed inside said housing and coupled to said means for controlling, which reads and write an IC memory card in accordance with a standard format, said first and second IC memory card devices being provided for data transfers between IC memory cards storing information in said customized format and IC memory cards storing information in said standard format.

* * * * *